Patented Oct. 30, 1923.

1,472,298

UNITED STATES PATENT OFFICE.

CASIMIR FUNK AND LOUIS FREEDMAN, OF NEW YORK, N. Y., ASSIGNORS TO HERMAN A. METZ, OF NEW YORK, N. Y.

DERIVATIVES OF SUPRARENIN AND PROCESS OF PREPARING THE SAME.

No Drawing.  Application filed August 4, 1922. Serial No. 579,744.

*To all whom it may concern:*

Be it known that we, CASIMIR FUNK and LOUIS FREEDMAN, citizens of the United States, residing at New York city, in the county of New York and State of New York, respectively, have invented certain new and useful Improvements in New Derivatives of Suprarenin and Processes of Preparing the Same, of which the following is a specification.

This invention relates to the preparation of derivatives of suprarenin represented by the general formula $$(OH)_2C_6H_3-CH(OR)-CH_2NHX$$

in which R stands for an alkyl or aryl group and X stands for hydrogen or an alkyl group, by the action of alcohols in the presence of mineral acids or other dehydrating agents or by the action of alkyl halides or other alkyl derivatives upon suprarenin base or salts thereof.

The invention relates further to the preparation of new suprarenin compounds of higher molecular weight, said compounds probably being a combination of two molecules of suprarenin in the nature of a lactone.

The invention is illustrated by the following specific example.

1 part by weight of racemic suprarenin hydrochloride

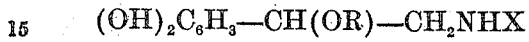

$$(OH)_2C_6H_3CH(OH)-CH_2NHCH_3.HCl$$

or its base is heated under reflux for several hours, say from 2 to 5 hours or longer, with 10 parts by weight of absolute ethyl alcohol containing in solution dry hydrochloric acid gas in quantity amounting to from 1 to 4 molecular equivalents of the suprarenin.

The reaction mixture is then cooled whereupon the new suprarenin derivative and the suprarenin compound of higher molecular weight crystallize in the form of their hydrochlorids or hydrochloric acid compounds and are separated from mother liquor. The two products are then separated from each other and purified by fractional crystallization from absolute alcohol.

The yield of the suprarenin derivative is about 40 per cent of the theoretical. The specific compound formed by the procedure described in the above example is the hydrochloride of 1.2-dihydroxy-4-methyl amino ethyl ethyl-4-ol benzene, (methylamino-ethyl-ethanol-pyrocatechol-hydrochloride) which is represented by the formula

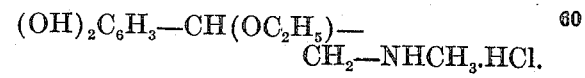

$$(OH)_2C_6H_3-CH(OC_2H_5)-$$
$$CH_2-NHCH_3.HCl.$$

It crystallizes in the form of clusters of thin rectangular prisms, is readily soluble in hot absolute alcohol and in water and has a melting point of 169°C. It is purified by recrystallization from hot absolute alcohol.

Other derivatives having the general formula $(OH)_2-C_6H_3-CH(OR)CH_2NHX$ in which R stands for an aryl or alkyl group other than the ethyl group and X stands for hydrogen or an alkyl group other than the methyl group may be prepared by substituting for the ortho-dioxyphenyl-ethanol-methylamin hydrochlorid (racemic suprarenin hydrochlorid) of the above example other starting materials in which the methyl group, represented by X in the above general formula is substituted by other groups and by substituting for the ethyl alcohol of the above example other alcohols or alkyl or aryl halides or derivatives.

The suprarenin compound of higher molecular weight formed as described in the above example amounts to about 10 per cent of the yield of the suprarenin derivative or about 4 per cent of the theoretical yield. The yield of this product varies with the amount of dehydrating agent employed, that is, hydrochloric acid in the above example, the maximum yield being obtained when about 4 molecular equivalents of hydrochloric acid are used. The chemical constitution of the product is not definitely known although, as is stated above, it is thought to be a combination of two molecules of suprarenin in the form of a lactone. The hydrochloride crystallizes in the form of rectangular prisms having a melting point of 180° to 183° C. soluble in water but only sparingly soluble in hot 70 per cent alcohol. It is insoluble in hot absolute alcohol. Its solubility in alcohol increases as the dilution of the alcohol increases.

We claim:

1. As new products, derivatives of ortho-dioxyphenylethanolaklylamin having the general formula, $$(OH)_2C_6H_3—CH(OR)—CH_2NHX$$

in which R represents an alkyl or aryl group and X represents hydrogen or an alkyl group.

2. As new products, derivatives of ortho-dioxyphenylethanolmethylamin having the general formula $$(OH)_2C_6H_3CH(OR)—CH_2NHCH_3$$

in which R represents an alkyl group.

3. A derivative of ortho-dioxyphenyletha-nolmethylamin having the formula $$(OH)_2C_6H_3—CH(OC_2H_5)—CH_2NHCH_3.HCl,$$

said product forming by crystallization from alcoholic solution clusters of thin rectangular prismatic crystals having a melting point of 169° C.

4. Process of preparing methyl-amino-ethyl-ethanol-pyrocatechol-hydrochloride and a suprarenin compound of higher molecular weight which comprises heating for several hours a mixture of ortho-dioxy-phenylethanolmethylamin hydrochloride, ethyl alcohol, and hydrochloric acid.

5. Process of preparing derivatives of suprarenin which comprises reacting upon a suprarenin compound with an alkyl compound in the presence of a dehydrating agent.

6. Process of preparing derivatives of suprarenin and suprarenin compounds of higher molecular weight which comprises digesting a mixture containing suprarenin, an alcohol and a dehydrating agent.

In testimony whereof, we affix our signatures.

CASIMIR FUNK.
LOUIS FREEDMAN.